Nov. 28, 1967     C. VELAZQUEZ ET AL     3,354,843
DOUGH FORMING MACHINE
Filed March 1, 1965     2 Sheets-Sheet 1
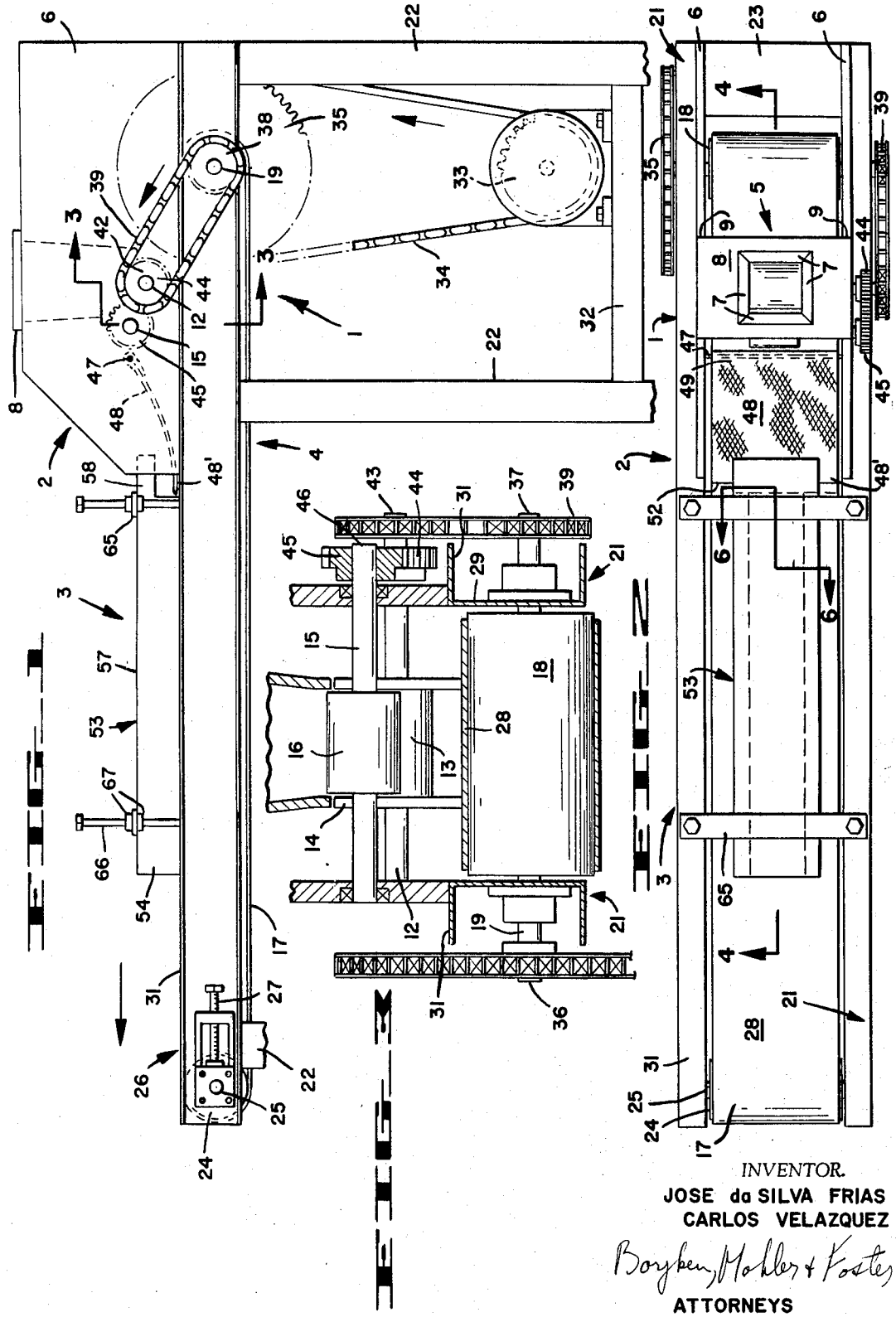
INVENTOR.
JOSE da SILVA FRIAS
CARLOS VELAZQUEZ
ATTORNEYS

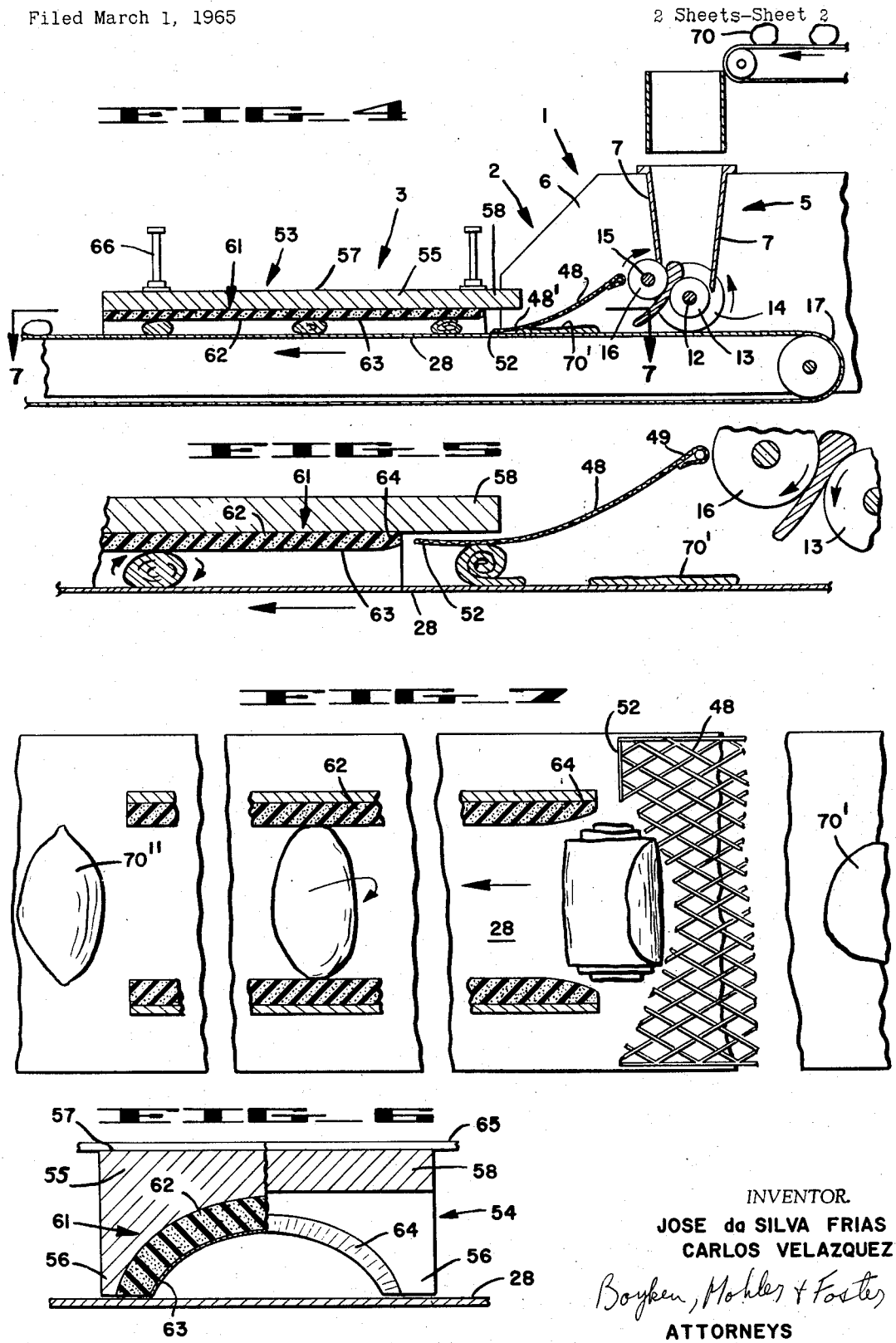

United States Patent Office 3,354,843
Patented Nov. 28, 1967

3,354,843
DOUGH FORMING MACHINE
Carlos Velazquez, 75 Paradise Ave. 94111, and Jose da Silva Frias, 2988 Mission St. 94110, both of San Francisco, Calif.
Filed Mar. 1, 1965, Ser. No. 436,073
3 Claims. (Cl. 107—9)

The present invention relates generally to the production of bread products and more particularly to a machine and method for forming bodies of dough preparatory to baking.

In high speed production of bread products such as bread loaves, rolls and buns it is necessary to provide great numbers of uniformly sized and shaped bodies of raw dough which then are placed in a conditioning or curing environment or into large baking ovens. When the dough is in a raw state great care must be taken to minimize rough handling since the vesicular structure of the dough is readily subject to deterioration. When the structure of the dough is improperly broken down the dough is said to be "deadened" or "killed," which means that its gas retention properties are reduced, resulting in a smaller volume, lower quality bread product from the same amount and type of dough, and other objectionable results. Methods and apparatus heretofore utilized in forming or molding dough have involved the use of cutters, extruders and rigid molds which produce high pressures and often heat, which are destructive of the dough structure.

It is accordingly an object of the present invention to provide an improved dough forming machine and method wherein successive bodies of raw dough may be formed to a desirable uniform shape efficiently at a high rate of speed.

It is another object of this invention to provide a dough forming machine which is simply constructed of relatively few parts which parts are readily accessible for cleaning and repair.

It is a further object of this invention to provide a dough forming machine and method which prevents "deadening" or "killing" of the dough during the molding or shaping operation as heretofore mechanically performed.

It is yet another object of this invention to provide a dough forming machine and method wherein is simulated the resiliency and yieldability of the palm of a hand as employed in a manual dough rolling operation.

Other objects and advantages of this invention will become apparent from the description of one embodiment of the invention taken in connection with the drawings, in which:

FIG. 1 is a side elevational view of a preferred form of the dough forming machine of this invention.

FIG. 2 is a top plan view of the preferred form of dough forming machine of this invention.

FIG. 3 is an enlarged fragmentary elevational cross-sectional view of the dough flattening portion of the dough forming machine as seen substantially from line 3—3 of FIG. 1.

FIG. 4 is an elevational cross-sectional side view of the dough forming machine as seen substantially from line 4—4 of FIG. 2 and showing a dough body in successive stages of formation during the forming process.

FIG. 5 is an enlarged fragmentary elevational cross-sectional side view of the dough forming machine showing the dough flattening, curling and molding elements and a dough body in successive stages of formation.

FIG. 6 is an enlarged cross-sectional end view of the dough entry end of the molding assembly as seen substantially from line 6—6 of FIG. 2.

FIG. 7 is an enlarged fragmentary horizontal cross-sectional view of portions of the dough forming machine substantially as seen from line 7—7 of FIG. 4 and showing a dough body in successive stages of formation.

In detail, referring to FIGS. 1, 2 and 4 a preferred embodiment of the dough forming machine of the present invention comprises a feed and dough flattening portion 1, seen at the right hand end of the figures, the direction of movement of the bodies of dough to be formed being from right to left in the figures.

Adjacent and to the left of the feed and flattening portion 1, (FIGS. 1, 2 and 4) is the dough curling portion, generally designated 2, at which the flattened dough body is rolled upon itself spirally into a roll.

A dough molding portion 3 is adjacent the curling portion 2 and to the left thereof as seen in the figures.

The portions 1, 2 and 3 are supported on a suitable elongated frame 4 (FIG. 1) comprised of rigidly connected framing members adapted to elevate the several working parts from the floor and in proper relation to perform their respective functions on successive bodies of dough moving at a high rate of speed from right to left (FIGS. 1, 2 and 4) in a row extending in the direction of such movement.

Feed and flattening portion 1

As the initial step in the dough forming process each successive dough body is flattened to a predetermined desired thickness, and means for accomplishing this include a downwardly tapered rectangular hopper 5 (FIGS. 2, 4) mounted in an elevated position above frame 4 proximate the right end thereof (FIG. 1), on a pair of spaced parallel upstanding frame sidewalls 6 extending from the right end along each lateral side of frame 4. The walls 7 of hopper 5 are formed to provide a pair of downwardly convergent forward and rear walls and similarly convergent sidewalls, the terms forward and rear being used with reference to the diection of advance of the dough bodies. At the upper ends of walls 7 is formed a peripheral horizontally outwardly directed flange 8 (FIG. 2) including lateral edge portions 9 which rest on the upper edge surface of sidewalls 6 for removably mounting hopper 5.

A horizontally extending shaft 12 (FIGS. 1, 3) is rotatably mounted in frame sidewalls 6 to extend therebetween at a point immediately below hopper 5 proximately midway between the hopper front and rear walls 7 (FIG. 1). Centrally of shaft 12 is an integrally formed cylindrical roller 13 (FIG. 3) having at each end an annular radially outwardly directed flange 14.

Horizontally extending shaft 15, similar to shaft 12 is rotatably mounted in frame sidewalls 6 in parallel relation to and spaced forwardly and upwardly of shaft 12. On shaft 15 is a roller 16 similar to roller 13, and the cylindrical surfaces of the two rollers are spaced from each other a distance equal to the desired thickness of a dough body in the flattened condition. Flanges 14 of roller 13 have a radial dimension greater than such thickness so as to extend immediately alongside a similar peripheral portion of each end of roller 16 (FIG. 4).

The positions of the rollers 13, 16 relative to hopper 5 are such that the bottom end of the hopper forward wall is adjacent an upper portion of roller 16. The bottom end of the hopper rear wall is adjacent an upper portion of roller 12 and extends between flanges 14, with the hopper sidewalls being formed complementarily with the outward edge of said flanges.

An endless horizontally extending conveyor belt 17 (FIGS. 1, 2) is disposed immediately below roller 13. At the right hand end (FIG. 2) belt 17 is engaged around a drive pulley 18 (FIG. 3) fixed on a horizontal shaft 19 rotatably mounted between a pair of spaced parallel horizontally extending frame members 21 proximate the right hand end of said members. Members 21 extend from feed and flattening portion 1 full length of frame 4 in the direction of movement of the dough bodies, supported on legs 22 (FIG. 1) spaced therealong, and connected to each other by cross member 23 at the right end of the members 21 (FIG. 2). Each member 21 is formed of structural channel including vertical web 29 and an upper horizontal flange 31 upon which are mounted sidewalls 6.

At the forward end of members 21 belt 17 is engaged around a pulley 24 (FIGS. 1, 2) fixed on horizontal shaft 25 journalled in frame members 21 and connected with a conventional belt adjustment assembly 26 or belt tightener for varying the tightness of belt 17. Drive means are provided for imparting rotation to shafts 12, 15 of rollers, 13, 16 respectively and to shaft 19 of drive pulley 18 whereby the upper run 28 of belt 17 is moved in the direction of advance of the dough bodies.

Drive arrangement

At the feed end of frame 4 a horizontal support member 32 (FIG. 1) is rigidly secured to legs 22 a distance below members 21. Bolted to support member 32 is a conventional electrical drive motor 33 in driving engagement with a continuous sprocket chain 34. Chain 34 extends upwardly around sprocket wheel 35 which is on one end 36 (FIG. 3) of shaft 19 outwardly of member 21 for rotation with said shaft. Sprocket wheel 35 is driven in a counterclockwise direction as shown in FIG. 1 and imparts counterclockwise rotation to pulley 18 through shaft 19, thus moving the upper run 28 of belt toward the left.

Rigidly secured on the end 37 of shaft 19 opposite to end 36, and which end 37 projects outwardly of member 21, is a smaller sprocket wheel 38 (FIG. 1). A sprocket chain 39 extends around sprocket wheel 38 and also around a sprocket wheel 42 which wheel is fixed on the outwardly projecting end 43 (FIG. 3) of shaft 12. Also mounted fast on shaft 12 between sprocket wheel 42 and sidewall 6 is a gear 44 which is enmeshed with an identical gear 45 fixed on the outwardly projecting end 46 of shaft 15. Thus roller 13 is driven in a counterclockwise direction while roller 16 is driven in a clockwise direction at the same rate of rotation (FIG. 4) so that a body of dough passing therebetween will be urged downwardly at the same rate of speed by rollers 13, 16.

Curling portion 2

From feed and flattening portion 1 the flattened dough body is carried on belt 17 through curling portion 2 which, in turn, comprises a horizontal rod 47 (FIGS. 1, 2) attached at its ends to sidewalls 6 to extend parallel to shaft 15 forwardly of and substantially on a level therewith, which rod 47 supports an end of a flexible curling element or sheet 48 (FIGS. 2, 5). Curling sheet 48, as illustrated, is preferably formed of a sheet of meshed wire material attached at its rear end 49 to rod 47, the end 49 being formed into a loop or hinge around rod 47 such that the sheet is free to pivot vertically about the rod. From rear end 49 sheet 48 extends forwardly and downwardly to a forward free end 52 which normally rests on belt 17 (FIG. 4). Sheet 48 is flexible and relatively limp and free of additional support, so that it sags into curved form with the forward portion as designated at 48' in flat engagement against belt 17 for a distance along forward end 52.

The curling sheet 48 functions to initiate curling of the flattened dough body about a horizontal axis extending transversely of its path of travel, by frictional engagement with the upper surface of the forward end of the advancing body. Continued curling is effected by continued frictional engagement of the moving body with the sheet which is maintained substantially stationary relative to said body. Wire mesh sheet, wherein the wire is formed into spirals, is particularly suitable for performing this function since the surface irregularities inherent in its formation provide an excellent gripping or friction engaging surface. At the same time the wire mesh sheet is of sufficient weight that it will remain in frictional engagement with the dough as the sheet rises on the body throughout the curling process. While wire mesh sheeting has been illustrated, as providing a particularly desirable curling sheet, it will be appreciated that other suitable materials exist providing a friction surface for engaging the dough. Heavy fabric such as is used for belting usually has the necessary surface roughness and weight. Also other materials may be utilized with projecting gripping elements being applied to the undersurface for facilitating the frictional engagement.

Molding portion 3

Immediately upon completion of curling, the dough body enters molding portion 3 which comprises a passage extending in the direction of advance of the dough body provided by upper run 28 of belt 17 and an open ended covering assembly 53 (FIGS. 1, 2, 4) stationarily and removably mounted immediately above belt 17 and straddling the path of travel of the dough bodies.

Assembly 53 includes a rigid elongated arch member 54 (FIGS. 1, 6) having upper cross portion 55 and a pair of leg portions 56 (FIG. 6) respectively on each side of the path of travel of the dough body. The upper surface 57 of portion 55 is horizontal while the lower surface thereof and the inner surface of leg portions 56 together define a transversely extending arch. At the rear or dough inlet end, which is the right hand end as seen in FIG. 1, upper portion 55 is formed to project rearwardly from assembly 53 in an overhanging portion 58. On the interior, concave, arcuate surface of member 54 is bonded a cushion 61 (FIGS. 4, 5, 6) of substantially uniform thickness. Cushion 61 is preferably formed of a layer of resilient sponge material 62, such as sponge rubber or one having the resilient characteristics of sponge rubber, bonded at one side directly to member 54 and having a layer of coarse woven fabric 63 bonded to its opposite surface which fabric is treated so as not to contaminate the dough with fibers. Equivalent materials may be used which provide a yieldable and resilient cushioning layer with a relatively rough interior friction surface. Proximate the dough entry or inlet end of member 54 resilient material 62 is gradually reduced in thickness toward said end to provide an outwardly flared entry and guide portion 64. A thickness of approximately one half inch for layer 62 has been found to be suitable, and such a layer having approximately the yieldable characteristics of the palm of a hand gives good results.

A pair of transversely extending tie bars 65 (FIGS. 1, 2) are spaced longitudinally along arch member 54, respectively near each end thereof and are fixed to upper surface 57. Each end of bars 65 projects laterally of member 54 and is apertured to receive a relatively long vertical bolt 66 which passes downwardly through bar 65 and through an appropriately aligned aperture in flange 31 of member 21. Fixed vertical positioning of member 54 relative to bolt 66 is accomplished by providing a pair of nuts 67 on the bolt respectively in tight engagement against the upper and lower surface of bar 65. Adjustable vertical positioning of member 54 relative to belt 17 is accomplished by providing a similar pair of nuts on the bolt which are tightened against each surface of flange 31. Member 54 is positioned upwardly adjacent belt 17 but free of contact with the belt which passes thereunder. The vertical position of member 54 is further selected to properly receive a dough body as will be described. Member 54 is positioned longitudinally along members 21 such that the forward portion of curling sheet 48 lies beneath overhanging portion 58 (FIG. 1) with forward end 52 of sheet 48 terminating just short of entry portion 64, so that a dough body enters entry portion 64 as it moves from curling sheet 48.

Operation

In operation, bodies of dough 70 (FIG. 4) are successively discharged at regular intervals and at a high rate into the upper end of hopper 5 from a conveyor or other conventional transfer device. At this point each body 70 contains substantially the same predetermined amount of dough but is randomly shaped as deposited onto the transfer device. The amount of dough in each body is chosen to provide the desired size and shape for the baked product produced therefrom.

When the body 70 reaches the lower end of hopper 5 it is drawn downwardly between oppositely rotating rollers 13, 16 and flattened between the rollers to a desired thickness as determined by the spacing between the rollers. A flat body 70' (FIG. 5) which is elongated and of substantially uniform width is produced since the dough is retained between flanges 14.

After it is flattened the dough body is deposited onto the upper run 28 of continuously moving belt 17 upon which it is advanced to engagement with curling sheet 48. As it is advanced on belt 17 the upper surface of the forward end of flattened body 70' is brought into contact with the undersurface of sheet 48 at the point where the curling sheet extends upwardly from belt 17. The forward end of the dough body is prevented from moving further forward by engagement with sheet 48 which is stationary relative to the path of advance, and the dough body is rolled backwardly upon itself to initiate rolling (clockwise in FIG. 5) and curling of the body. Continued contact with the moving belt and frictional engagement with the stationary sheet cause continued curling to a spiral form, and simultaneously the body is carried forwardly by belt 17 so that when the flat sheet of dough is completely curled to form a spiral roll, the roll moves from the forward end 52 of sheet 48 into entry portion 64 of the molding assembly 53, with its axis extending transversely of the path of advance.

As the curled body is moved from sheet 48 it enters the inlet end of molding assembly 53 at flared entry portion 64 without interruption of its rolling motion and is passed further into arch member 54 against molding cushion 61. The vertical placement of arch member 54 relative to belt 17 is determined by the quantity of dough in each dough body and is such that when the body passes through cushion 61 the moving body is urged against the cushion and pressure between the body and cushion exists sufficient to cause the body to be molded to the cross-sectional contour of the cushion while at the same time the cushion yields and compresses slightly. The stationary molding surface of cushion 61 is sufficiently rough so that frictional engagement between cushion and dough body resists slippage and promotes rotation of the body (clockwise in FIG. 5) through the molding operation. The result is a homogeneous dough body 70" (FIG. 7) molded to a convex cross-sectional contour that is generally lemon or egg-shaped in form with somewhat pointed projections at each end. When baked, dough so shaped provides a roll, known commonly as a "St. Francis roll." After completion of the molding operation the dough body is carried on belt 17 past the outlet end of member 54 into position for subsequent baking operation.

It will be appreciated that molding cushion 61 may be formed to any concave configuration as will be appropriate for the baked product in question, as for example, differently shaped rolls, buns, or bread loaves. It should further be noted that the provision of a yieldable or resilient molding cushion is an extremely advantageous aspect of the dough forming machine. The cushion simulates the resiliency and yieldability of the palm of a hand in a manual dough forming operation. Molding methods utilizing extruding and cutting apparatus or rigid mold means involve the application of greater pressure on the dough and in some instances heat. These are destructive of the dough structure and reduce the gas retaining quality of the dough which gas retention is necessary for producing a baked product which is light and of maximum volume relative to the amount of dough used. In general, rough treatment of the dough tends to have this destructive effect i.e. tends to "deaden" the dough, with the result that with the same amount of dough a smaller volume product is produced. By the present yieldable molding method and apparatus embodying such method "deadening" of the dough is minimized so that a maximum volume, maximum quality baked product results as would result from hand-molding the dough.

Broadly, the method of this invention calls for rolling a body of dough through an elongated path of travel in engagement with two opposite sides of the inner surface of the path in which the surface of one side of the path is stationary and yieldable and has a concave cross-sectional contour transversely of the path, whereby the body is molded to a convex cross-sectional contour corresponding to the cross-sectional contour of the surface of the one side of the path.

Apparatus generally embodying the method is seen to include a stationary open-ended mold for molding a rolling body of dough, disposed across the path of advance of the dough body extending longitudinally along the path. The mold has a face engaging the rolled body having a concave cross-sectional contour in a direction transversely of the path that is complementary to the desired convex curvature of the dough roll to be formed. Also included are means supporting the mold relative to a conveyor which carries the dough body for engagement of the roll engaging side of the mold with the rolled body, under pressure, while the body is molded to have a contour complementary to the dough engaging side, during movement from one end of the mold to the other, the dough engaging side being of resilient material.

It is to be understood that the claims appended hereto are intended to cover all changes and modifications of the example of the invention herein chosen for purposes of disclosure which do not constitute departures from the spirit and scope of the invention. For example, any number of flattening, curling and molding assemblies as described may be ganged together in parallel fashion with common drive means to greatly multiply the forming capacity of the apparatus.

We claim:

1. In a machine for forming dough into rolls for baking, which machine includes means for forming dough into a flat sheet, a conveyor movable in one direction for supporting such sheet for movement in one direction along a path of travel, and means for rolling said sheet on itself about an axis extending transversely of said path during said movement of said conveyor and sheet to form said sheet spirally into a roll, the improvement that comprises:

(a) a stationary open-ended mold disposed across said path providing an inlet at one end and an outlet at the opposite end and extending longitudinally thereof having a roll engaging side facing said conveyor, said side having a concave cross-sectional contour in a direction transversely of said path that is complementary to the desired convex outer curvature of the roll to be formed;

(b) means supporting said mold in a position relative to said conveyor for entry of said roll into said inlet and exit out of said outlet and for engagement of said roll engaging side thereof with said roll, under pressure, while said conveyor carries said roll past said mold into said inlet and out of said outlet, whereby said roll will be rolled through said mold from one end thereof to the other and will be molded to have a convex outer contour upon moving out of said outlet that is complementary to the contour of said dough engaging side of said roll;

(c) said dough engaging side of said mold being of resilient material yieldable under the pressure of said roll of dough to thereby simulate the resiliency and yieldability of the palm of a hand in a manual dough rolling operation.

2. In a machine as defined in claim 1:

(d) said conveyor having a flat dough supporting surface and said resilient side of said mold being generally semi-cylindrical in cross-sectional contour, with the edges thereof extending longitudinally of said path being sufficiently close to the dough supporting side of said conveyor to substantially restrict the dough of such roll during passage thereof through said mold to within the confines of said mold and between said semi-cylindrical side of the latter and said conveyor.

3. In a machine as defined in claim 1:

(d) said resilient side of said mold being of substantial thickness and the surface thereof for engaging said dough having a friction surface to resist slippage of said roll relative thereto and to promote rolling of said roll;

(e) the concave side of said mold at its inlet end being flared outwardly to facilitate entry of said roll into said mold.

References Cited
UNITED STATES PATENTS 3,143,084  8/1964  Rhodes _____ 107—9

FOREIGN PATENTS 725,217  3/1955  Great Britain.

WALTER A. SCHEEL, *Primary Examiner.*

J. SHEA, *Assistant Examiner.*